United States Patent
Kim et al.

(10) Patent No.: US 10,301,761 B2
(45) Date of Patent: May 28, 2019

(54) WASHING MACHINE DRIVING APPARATUS AND WASHING MACHINE INCLUDING SAME

(71) Applicant: AMOTECH CO., LTD., Incheon (KR)

(72) Inventors: Byung Soo Kim, Anyang-si (KR); Hyung Hwan Ko, Anseong-si (KR); Hak Rok Kim, Daegu (KR); Se Ki Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 46 days.

(21) Appl. No.: 15/306,911

(22) PCT Filed: Apr. 29, 2015

(86) PCT No.: PCT/KR2015/004336
§ 371 (c)(1),
(2) Date: Oct. 26, 2016

(87) PCT Pub. No.: WO2015/167255
PCT Pub. Date: Nov. 5, 2015

(65) Prior Publication Data
US 2017/0044705 A1    Feb. 16, 2017

(30) Foreign Application Priority Data
Apr. 30, 2014 (KR) .................. 10-2014-0052616

(51) Int. Cl.
*H02K 7/00* (2006.01)
*D06F 23/04* (2006.01)
(Continued)

(52) U.S. Cl.
CPC ............ *D06F 37/304* (2013.01); *D06F 23/04* (2013.01); *D06F 37/12* (2013.01); *D06F 37/206* (2013.01);
(Continued)

(58) Field of Classification Search
CPC ......................... D06F 37/30–40; H02K 16/00
See application file for complete search history.

(56) References Cited

FOREIGN PATENT DOCUMENTS

CN   102877269 A  *  1/2013
JP   2000000396        1/2000
(Continued)

OTHER PUBLICATIONS

International Search Report—PCT/KR2015/004336 dated Jul. 7, 2015.

*Primary Examiner* — Spencer E Bell
(74) *Attorney, Agent, or Firm* — Cantor Colburn LLP

(57) ABSTRACT

A washing machine driving apparatus comprises: a drive motor of a double rotor-double stator structure where the drive motor comprises an inner rotor and an outer rotor controllable independently by a double stator, and optionally generating inner rotor output and outer rotor output; a first inner shaft transferring the inner rotor output as a first input; a first outer shaft rotatably coupled to an outer periphery of the first inner shaft, and transferring the outer rotor output as a second input; a planetary gear unit where a gear ratio of a transmission output generated from a carrier is controlled by the second input applied to a ring gear through the first outer shaft, when the first input is applied to a sun gear through the first inner shaft; and a protection unit protecting the inner rotor where an outer peripheral portion of protection unit is supported by the double stator.

10 Claims, 7 Drawing Sheets

(51) Int. Cl.
  *D06F 37/12*   (2006.01)
  *D06F 37/20*   (2006.01)
  *D06F 37/30*   (2006.01)
  *D06F 37/40*   (2006.01)
  *H02K 16/00*   (2006.01)
  *H02K 7/116*   (2006.01)
  *D06F 37/26*   (2006.01)
(52) U.S. Cl.
  CPC .............. *D06F 37/26* (2013.01); *D06F 37/40* (2013.01); *H02K 7/003* (2013.01); *H02K 7/116* (2013.01); *H02K 16/00* (2013.01); *H02K 2213/12* (2013.01)

(56) References Cited

FOREIGN PATENT DOCUMENTS

| | | |
|---|---:|---|
| JP | 2001025599 | 1/2001 |
| JP | 2006043153 | 2/2006 |
| KR | 1020060006418 | 1/2006 |
| KR | 100548310 | 2/2006 |
| KR | 1020080092023 | 10/2008 |
| KR | 1020130051578 | 5/2013 |

\* cited by examiner

WASHING MACHINE DRIVING APPARATUS AND WASHING MACHINE INCLUDING SAME

TECHNICAL FIELD

The present invention relates to a washing machine driving apparatus that may drive an inner rotor and an outer rotor independently, and a washing machine having the same.

BACKGROUND ART

As disclosed in Korean Patent Registration Publication No. 10-0548310 on Jan. 24, 2006, a conventional washing machine includes: an outer case forming an outer shape; an outer tub which is supported on an inside of the outer case and receives wash water therein; an inner tub which is rotatably accommodated in an inside of the outer tub and is used for both washing and dehydrating; a pulsator which is mounted relatively rotatably in an inside of the inner tub, to thus form a washing water flow; a drive motor for generating a driving force for rotating the inner tub and the pulsator; an inner tub rotating shaft which receives the driving force of the drive motor thereby rotating the inner tub; a pulsator rotating shaft which receives the driving force of the drive motor thereby rotating the pulsator; a sun gear which is connected to the drive motor and is connected to the pulsator rotating shaft; a plurality of planetary gears which are simultaneously engaged with both the sun gear and a ring gear; a carrier supporting the planetary gears so as to be rotated and revolved; and a clutch spring for controlling the rotation of the inner tub and the pulsator during washing or dehydrating.

The conventional washing machine disclosed in Korean Patent Registration Publication No. 10-0548310 has a planetary gear set including the sun gear, the ring gear, the planetary gears and the carrier, and reduces the rotational force of the drive motor, to then be transferred to the pulsator and the inner tub, and operates the clutch spring to selectively transmit power to the pulsator and the inner tub, to thus rotate only the pulsator during performing a washing stroke or to thus rotate both the pulsator and the inner tub simultaneously during performing a dehydrating stroke.

However, the conventional washing machine needs the planetary gear set and the clutch in order to selectively rotate the pulsator and the inner tub, to accordingly cause the configuration of the conventional washing machine to be complicated and the production cost thereof to increase.

Further, since the conventional washing machine is configured to have the planetary gear set and the clutch spring between the drive motor and the outer tub, the space occupied in the height direction of the washing machine is increased and thus the height of the washing machine increases. Otherwise, since the height of the inner tub should be reduced in an identical height of the washing machine, there is a problem that a washing capacity is reduced.

As a result, since the conventional washing machine has a structure that the pulsator and the inner tub may be rotated only in an identical direction, but may not be rotated in opposite directions to each other, there is a limit to improve performance of the washing machine.

In addition, since the conventional drive motor is configured in a state where the rotor is exposed to the outside, there is a fear that the interference with other parts may occur. As a result, a sufficient distance between the drive motor and the other part should be maintained to avoid interference to thus cause deterioration of space utilization.

Technical Problem

To solve the above problems or defects, it is an object of the present invention to provide a washing machine driving apparatus that may independently drive an inner rotor and an outer rotor, respectively, and that may be provided with a planetary gear set in one of the inner rotor and the outer rotor, to thereby shift a rotation speed of any one of the inner rotor and the outer rotor to thus enable torque conversion.

It is another object of the present invention to provide a washing machine driving apparatus capable of independently driving a pulsator and a washing tub, respectively, to thereby enable dual-power and mono-power implementations and form a variety of water flow patterns, and a washing machine having the same.

It is still another object of the present invention to provide a washing machine driving apparatus in which a protector protecting a rotor is provided with a stator to thus protect the rotating rotor, to thereby prevent interference between the rotor and other parts, to thus mount the other parts at a position close to the rotor, and to thereby improve space utilization, and a washing machine having the washing machine driving apparatus.

Technical Solution

To accomplish the above and other objects of the present invention, according to an aspect of the present invention, there is provided a washing machine driving apparatus comprising: a drive motor of a double rotor-double stator structure in which the drive motor comprises an inner rotor and an outer rotor that are controllable independently by a double stator, and optionally generates an inner rotor output and an outer rotor output; a first inner shaft that transfers the inner rotor output as a first input; a first outer shaft that is rotatably coupled to an outer periphery of the first inner shaft, and that transfers the outer rotor output as a second input; a planetary gear unit in which a gear ratio of a transmission output that is generated from a carrier is controlled by the second input is applied to a ring gear through the first outer shaft, when the first input is applied to a sun gear through the first inner shaft; and a protection unit for protecting the inner rotor in which an outer peripheral portion of protection unit is supported by the double stator.

Preferably but not necessarily, the outer rotor is connected to the first outer shaft, the inner rotor is connected to the first inner shaft, and the first inner shaft is rotatably mounted in an inside of the first outer shaft.

Preferably but not necessarily, the washing machine driving apparatus further comprises: a second outer shaft connected to the ring gear of the planetary gear set; and a second inner shaft connected to the carrier of the planetary gear set.

Preferably but not necessarily, the planetary gear set comprises: a ring gear connecting between the first outer shaft and the second outer shaft; a sun gear coupled to the first inner shaft; a plurality of planetary gears engaged to an outer surface of the sun gear and an inner surface of the ring gear; and a carrier to which the plurality of planetary gears are rotatably supported and that is connected to the second inner shaft.

Preferably but not necessarily, the first outer shaft is rotatably supported in two-way directions by a first bearing, and the second outer shaft is rotatably supported in two-way directions by a second bearing, wherein the first bearing is fixed to a stator support and the second bearing is mounted in a bearing housing.

Preferably but not necessarily, the inner rotor comprises: a first magnet which is disposed with a certain gap on an inner surface of the stator; a first back yoke which is disposed on a rear surface of the first magnet; and an inner rotor support to which the first magnet and the first back yoke are fixed.

Preferably but not necessarily, the outer rotor comprises: a second magnet which is disposed with a certain gap on an outer surface of the stator; a second back yoke which is disposed on a rear surface of the second magnet; and an outer rotor support to which the second magnet and the second back yoke are fixed, and a first connector connected to an outer surface of the outer shaft is formed on an inner surface of the outer rotor support and the first connector is disposed on an upper surface of the first bearing to prevent the first bearing from being seceded.

Preferably but not necessarily, a round per minute (RPM) of the second input which is applied to the ring gear is set to be smaller than that of the first input which is applied to the sun gear, and an output of the carrier is decelerated at the RPM of the first input. In this case, the first input has a high-speed, low-torque characteristic, and the output of the carrier has a low-speed high-torque characteristic, and is used for a laundry washing or rinsing stroke of the washing machine.

Preferably but not necessarily, the output of the ring gear is not shifted when a rotational direction and a RPM of the first input are the same as those of the second input. In this case, the first and second inputs have a high-speed, low-torque characteristic, respectively, and the output of the ring gear is a high-speed, low-torque characteristic, and is used for a dehydrating stroke of the washing machine.

Preferably but not necessarily, the double stator comprises: a stator core assembly around a number of stator cores of which first and second coils are wound to drive the inner rotor and the outer rotor; and a stator support that is formed integrally with the stator core assembly and on an outer circumferential portion of which an outer tub is fixed and on an inner circumferential portion of which the first outer shaft is rotatably supported.

Preferably but not necessarily, the stator support comprises: a core fixing portion in which the stator cores are mounted; a bearing fixing portion extending inwardly from the core fixing portion to thus fix a first bearing; a cover portion extending outwardly from the core fixing portion and that is formed in a cylindrical shape to thus secure the outer rotor; and an outer tub fixing portion extending outwardly from the cover portion and that is fixed to the outer tub.

Preferably but not necessarily, the protection unit is a protective cover that is located to cover a lower surface of the inner rotor, and whose edge is fixed to the stator support.

Preferably but not necessarily, the protection unit is a protector that is extended from the core fixing portion of the stator core support and covers an outer surface of the inner rotor.

Advantageous Effects

As described above, a washing machine driving apparatus according to the present invention may independently drive an inner rotor and an outer rotor, respectively, and may be provided with a planetary gear set in one of the inner rotor and the outer rotor, to thereby shift a rotation speed of any one of the inner rotor and the outer rotor to thus enable torque conversion.

In addition, a washing machine driving apparatus according to the present invention is configured to include a protector protecting a rotor provided with a stator to thus protect the rotating rotor, to thereby prevent interference between the rotor and other parts, to thus mount the other parts at a position close to the rotor, and to thereby improve space utilization.

In addition, a washing machine according to the present invention may be capable of independently driving a pulsator and a washing tub, respectively, to thereby enable dual-power and mono-power implementations and form a variety of water flow patterns.

In addition, a washing machine according to the present invention is configured to connect an outer rotor to a washing tub and connect an inner rotor to a pulsator, to thus cause a large-torque outer rotor to rotate the washing tub requiring a large-torque for starting, to thereby improve performance of the washing machine.

BEST MODE

Figure 1:
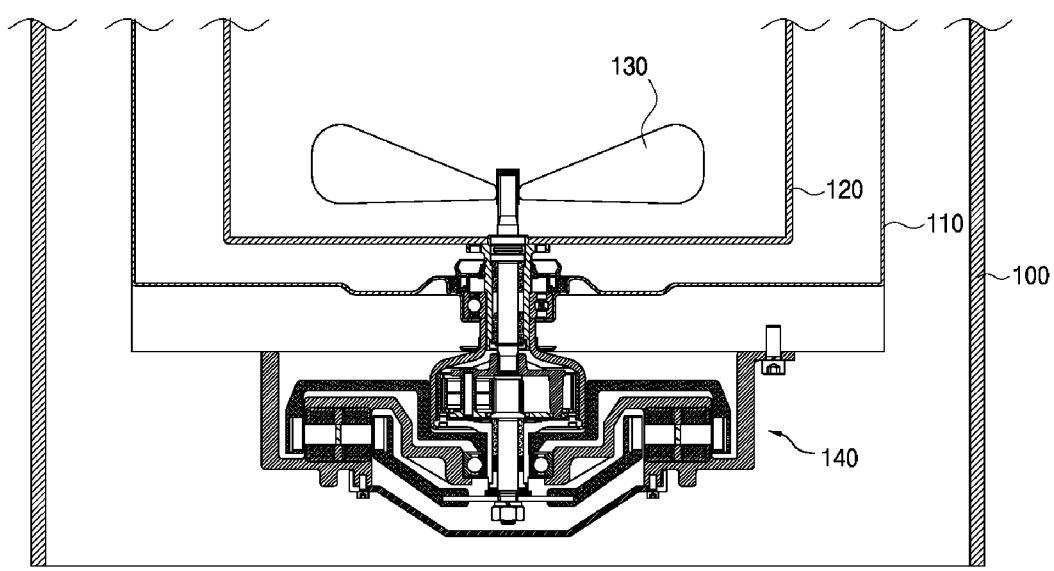
FIG. 1 is a cross-sectional view of a washing machine according to an embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms may be changed according to user's or operator's intention, or the custom. Definitions of these terms herein need to be made based on the contents across the whole application.

Figure 2:
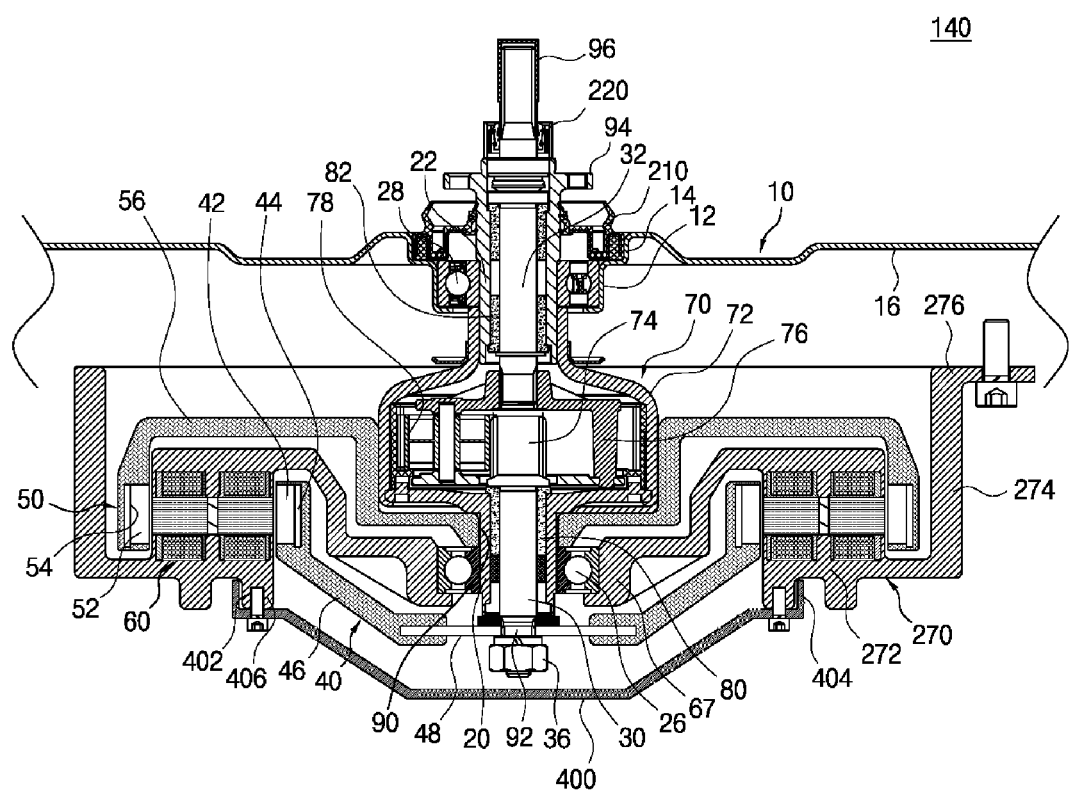
FIG. 2 is a cross-sectional view of a washing machine driving apparatus according to an embodiment of the present invention.

FIG. 1 is a cross-sectional view of a washing machine according to an embodiment of the present invention, and FIG. 2 is a cross-sectional view of a washing machine driving apparatus according to a first embodiment of the present invention.

Referring to FIG. 1, a washing machine according to an embodiment of the present invention includes: a case 100 forming an outer appearance; an outer tub 110 which is disposed in an inside of the case 100 and accommodating washing water; a washing tub 120 which is rotatably disposed inside the outer tub 110 to perform washing and dehydrating; a pulsator 130 which is rotatably disposed inside the washing tub 120 to form washing water flows; and a washing machine driving apparatus 140 which is mounted under the washing tub 120 and the outer tub 120, to provide a driving force necessary for a washing stroke, a rinsing stroke, a detangle stroke, and a dehydrating stroke, for the washing tub 120 and the pulsator 130, simultaneously or selectively.

As shown in FIG. 2, the washing machine driving apparatus 140 includes: a drive motor of a double rotor-double stator structure that is mounted on a lower portion of the outer tub 110 and that generates a high-speed, low-torque dual-power from the inner rotor 40 and the outer rotor 50; and a planetary gear set 70 that is a torque converter that receives high-speed, low-torque first and second inputs that are provided by the inner rotor 40 and the outer rotor 50 of the drive motor and selectively shifts (or torque-coverts) so as to provide a first output to satisfy a low-speed, high-torque characteristic required for a washing stroke and a rinsing stroke and a second output to satisfy a high-speed, low-torque characteristic required for a dehydrating stroke.

First, the planetary gear set 70 is provided between the drive motor and the washing tub 120, and receives the output of the inner rotor 40 of the drive motor through a first inner shaft 30 to then be transmitted to a sun gear 74, and receives the output of the outer rotor 50 of the drive motor through a first outer shaft 20 to then be transmitted to a ring gear 72.

Then, the high-speed, low-torque first input received through the first inner shaft 30 is shifted (or torque-converted) while passing through the sun gear 74 and planetary gears 78 of the planetary gear set 70 and then is transmitted to the second inner shaft 32 as the output of a carrier 76, and the high-speed, low-torque second input transmitted to the ring gear 72 through the first outer shaft 20 is transmitted to the outer shaft 22 without the shift transmission (or torque conversion). The structure and operation of the planetary gear set 70 will be described below in detail.

The drive motor includes: a stator 60 on an outer side of which a first coil 66 is wound, and on an inner side of which a second coil 68 is wound; an outer rotor 50 that is arranged with a gap on an outer surface of the stator 60 and interacts with the first coil 66; and an inner rotor 40 that is arranged with a gap on an inner surface of the stator 60 and interacts with the second coil 66.

The outer rotor 50 is connected to outer shafts 20 and 22, and the inner rotor 40 is connected to inner shafts 30 and 32. The outer shafts 20 and 22 are formed of a hollow shape, and the inner shafts 30 and 32 are rotatably disposed inside the outer shafts 20 and 22.

The outer shafts 20 and 22 are formed in a cylindrical shape so that the inner shafts 30 and 32 passes through the outer shafts 20 and 22, and include: a first outer shaft 20 whose one end is connected to one end of the outer rotor 50 and whose other end is connected to one end of the ring gear 72 of the planetary gear set 70; and a second outer shaft 22 whose one end is connected to one end of the outer rotor 50 and whose other end is connected to the other end of the ring gear 72 of the planetary gear set 70.

Then, the inner shafts 30 and 32 include: a first inner shaft 30 that is connected to the inner rotor 40 and is connected to the sun gear 74 of the planetary gear set 70; and a second inner shaft 32 that is connected to the inner rotor 40 and is connected to the carrier 76 of the planetary gear set 70.

Figure 3:
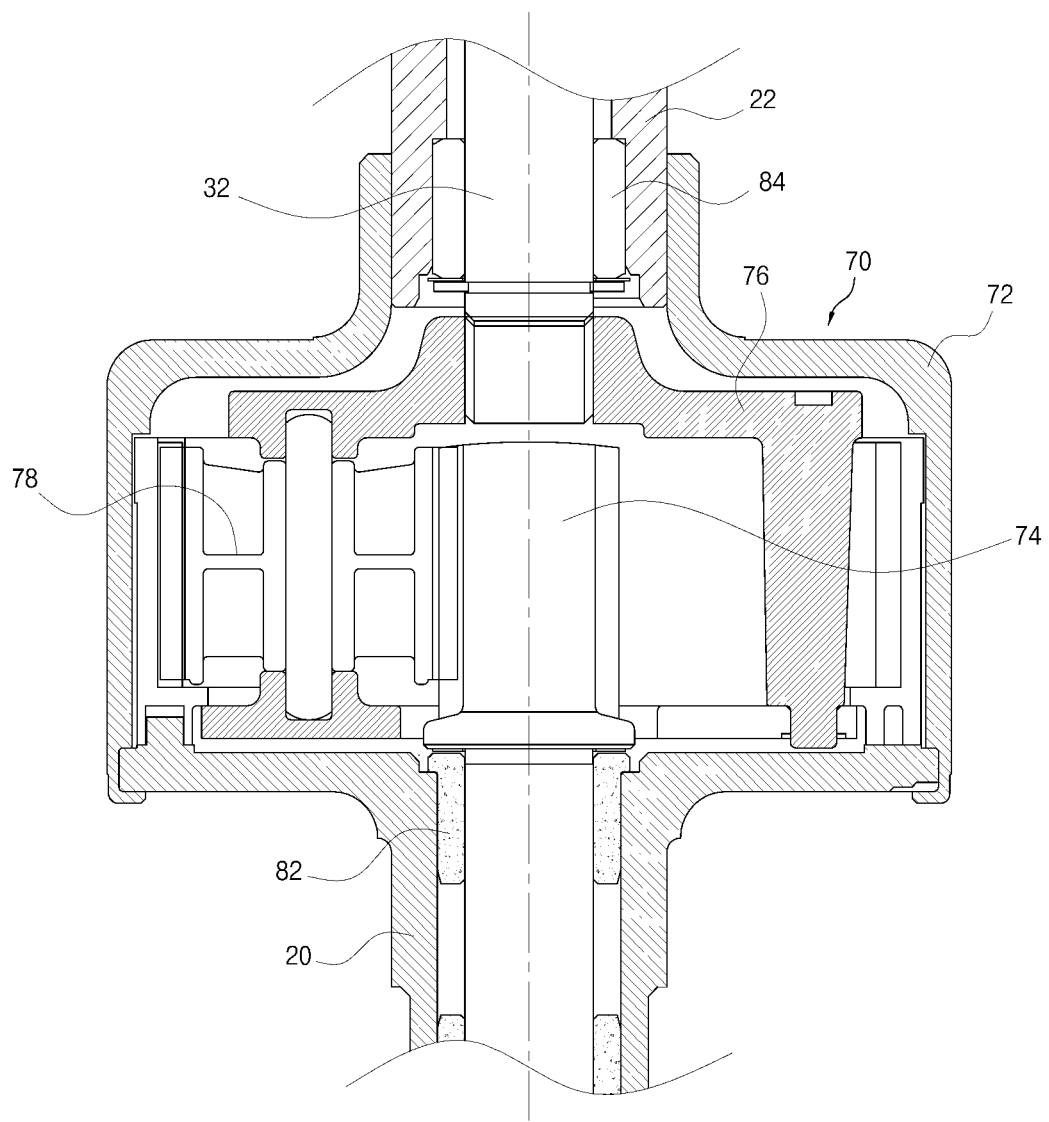
FIG. 3 is an enlarged cross-sectional view of a planetary gear set according to an embodiment of the present invention.

As shown in FIG. 3, the planetary gear set 70 includes: the ring gear 72 connecting between the first outer shaft 20 and the second outer shaft 22; the sun gear 74 integrally coupled to the first inner shaft 30; a plurality of planetary gears 78 engaged with an outer surface of the sun gear 74 and an inner surface of the ring gear 72; and the carrier 76 to which the plurality of planetary gears 78 are rotatably supported and that is connected to the second inner shaft 32.

The planetary gear set 70 is configured so that the first outer shaft 20 and the second outer shaft 22 are connected by the ring gear 72 and thus the rotational speed of the first outer shaft 20 is transferred to the second outer shaft 22. Therefore, the rotational speed of the first outer shaft 20 is the same as that of the second outer shaft 22.

In addition, the first inner shaft 30 is formed integrally with the sun gear 74, and the second inner shaft 32 is spline-coupled or serration-coupled with the carrier 76. The carrier 76 is rotatably supported to a rotational axis provided in the center of the planetary gears 78. As a result, the rotational speed of the first inner shaft 30 is decelerated to then be transmitted to the second inner shaft 32.

In this way, the inner shafts 30 and 32 are interconnected via the planetary gear set 70 to thus decelerate the rotational speed of the inner rotor 40 to then be transmitted to the pulsator 130, to thereby increase the torque of the pulsator 130 and accordingly be applicable to a large-capacity washing machine.

A first sleeve bearing 80 is provided in a cylindrical form between an outer circumferential surface of the first inner shaft 30 and an inner circumferential surface of the first outer shaft 20, to thus rotatably support the first inner shaft 30.

A second sleeve bearing 82 is provided in a cylindrical form between an outer circumferential surface of the second outer shaft 22 and an inner circumferential surface of the second inner shaft 32, to thus rotatably support the second inner shaft 32.

A first link 90 to which an outer rotor support 56 of the outer rotor 50 is connected is formed on an outer surface of the first outer shaft 20 and a second link 92 to which an inner rotor support 46 of the inner rotor 40 is connected is formed on a lower end of the first inner shaft 30.

The first link 90 and the second link 92 may be serration-coupled or spline-coupled through protrusions formed on the outer surfaces of the first outer shaft 20 and the first inner shaft 30, or mutually key-coupled through key grooves formed on the outer surfaces of the first outer shaft 20 and the first inner shaft 30.

Here, a second locking nut 36 is screwed and coupled at the lower end of the first inner shaft 30, in which the second locking nut 36 prevents the departure of the inner rotor support 46 of the inner rotor 50 from the first inner shaft 30.

A third link 94 is formed on the upper outer surface of the second outer shaft 22 in which the washing tub 120 is connected to the third link 94, and a fourth link 96 is formed on the upper outer surface of the second inner shaft 32 in which the pulsator 130 is connected to the fourth link 96.

The third link 94 and the fourth link 96 may be serration-coupled or spline-coupled through protrusions formed on the outer surfaces of the second outer shaft 22 and the second inner shaft 32, or mutually key-coupled through key grooves formed on the outer surfaces of the second outer shaft 22 and the second inner shaft 32.

A first seal 220 is mounted between the second outer shaft 22 and the second inner shaft 32 to prevent the washing water from leaking, and a second seal 210 is mounted between the second outer shaft 22 and a bearing housing 10 to prevent the washing water from leaking.

A first bearing 26 is disposed on the outer surface of the first outer shaft 20, to thus rotatably support the first outer shaft 20 in two-way directions and a second bearing 28 is disposed on the outer surface of the second outer shaft 22, to thus rotatably support the second outer shaft 22 in two-way directions.

The first bearing 26 is provided on a bearing support 67 integrally formed in a stator support 68 of the stator 60, and the second bearing 28 is mounted in the bearing housing 10.

The bearing housing 10 is formed of a metallic material, and includes: a second bearing mount portion 12 in which the second bearing 28 is mounted; a second seal fastener 14 that is extended outwardly from the second bearing mount portion 12 to thus fasten the second seal 210; and an outer fixing portion 16 that is extended outwardly from the second seal fastener 14 to thus be fixed to the outer tub 110.

The inner rotor 40 includes: a plurality of first magnets 42 that are disposed on the inner surface of the stator 60 with a certain gap; a first back yoke 44 disposed on the rear surfaces of the plurality of first magnets 42; and an inner rotor support 46 that is integrally formed with the first magnets 42 and the first back yoke 44 by an insert molding method.

In addition, a metal plate 48 is integrally formed on an inner surface of the inner rotor support 46 by an insert molding method in which the metal plate 48 connects the inner rotor support 46 with the inner shafts 30 and 32.

A flat plate made of a BMC (Bulk Molding Compound) material or a BMC powder sintered plate may be used on an inner surface of the inner rotor support 46, in place of the metal plate 48.

Here, the inner rotor support 46 is integrally formed with the plurality of first magnets 42, the first back yoke 44, and the metal plate 48 by molding a thermosetting resin, for example, a BMC (Bulk Molding Compound) molding material such as polyester. Thus, the inner rotor 40 may have waterproof performance, and shorten the manufacturing process.

Therefore, when the inner rotor 40 rotates, the inner shafts 30 and 32 are rotated, and the pulsator 130 that is connected to the inner shafts 30 and 32 is rotated.

Here, the pulsator 130 may be fully rotated by the torque of the inner rotor 40 due to the rotational torque that is not large.

Then, the outer rotor 50 includes: a plurality of second magnets 52 that are disposed on the outer surface of the stator 60 with a certain gap; a second back yoke 54 disposed on the rear surface of the plurality of the second magnets 52; and an outer rotor support 56 that is integrally formed with the second magnets 52 and the second back yoke 54 by an insert molding method.

Here, the outer rotor support 56 is integrally formed with the plurality of second magnets 52 and the second back yoke 54 by molding a thermosetting resin, for example, a BMC (Bulk Molding Compound) molding material such as polyester.

The inner surface of the outer rotor support 56 is connected to the first link 90 of the first outer shaft 20 and the outer rotor support 56 is rotated with the first outer shaft 20, and the second magnet 52 and the second back yoke 54 are fixed to the outer surface thereof.

Therefore, when the outer rotor 50 rotates, the outer shafts 20 and 22 are rotated, and the washing tub 120 associated with the outer shafts 20 and 22 is rotated.

The torque of the outer rotor 50 is larger than that of the inner rotor 40. Then, a larger torque is needed in order to rotate the washing tub 120, when compared with the torque needed to rotate the pulsator 130.

In this way, the washing machine driving apparatus according to the embodiment is configured so that the outer rotor 50 having a large torque is connected to the washing tub 120 that requires a large torque, to thereby realize a high-capacity washing machine.

The stator 60 includes: a plurality of stator cores 62 that are arranged in an annular shape; non-magnetic bobbins 64 that are configured to wrap the outer circumferential surfaces of the plurality of stator cores 62, respectively; a first coil 66 that is wound on one side of each of the stator cores 62; a second coil 68 that is wound on the other side of each of the stator cores 62; and a stator support 270 in which the plurality of stator cores 62 are arranged in an annular shape and that is fixed to the outer tub 110.

The stator 60 applied for the embodiment of the present invention is configured to form a double stator that may the inner rotor 40 and the outer rotor 50 selectively or simultaneously, in correspondence to a drive signal, by applying the drive signal to the first coil 66 wound on one side of the stator cores 62 and the second coil 68 wound on the other side thereof selectively or simultaneously.

The stator support 270 is integrally formed with the stator cores 62 by an insert molding method after arranging the plurality of stator cores 62 at certain intervals in an annular form in the circumferential direction thereof in a mold.

In other words, the stator support 270 is molded by the insert molding method by molding a thermosetting resin, for example, a BMC (Bulk Molding Compound) molding material such as polyester. In this case, the plurality of stator cores 62 are arranged at certain intervals in an annular form in the circumferential direction thereof in a mold, and thus are integrally formed.

Other than the structure that the stator support 270 is integrally formed with the stator cores 62 by insert molding, the stator support 270 may be separately manufactured from the stator cores 62 and then coupled with the stator cores 62 by using bolts.

The stator support 270 includes: a core fixing portion 272 in which the stator cores 62 are mounted; a bearing fixing portion 67 extending inwardly from the core fixing portion 272 to thus fix a first bearing 26; a cover portion 274 extending outwardly from the core fixing portion 272 and that is formed in a cylindrical shape to thus secure the outer rotor 50; and an outer tub fixing portion 276 extending outwardly from the cover portion 274 and that is fixed to the outer tub 110.

Thus, the cover portion 274 is formed in the stator support 270 and is arranged at a certain gap from an outer surface of the outer rotor 50, to thus cause a separate motor cover to be unnecessary to protect the outer rotor 50, to thereby reduce the number of parts, and to thus protect the outer rotor 50 to thereby prevent the outer rotor 50 from interfering with other parts.

Then, the stator support unit 270 is provided with a protective unit to prevent the rotating inner rotor 40 from interfering with other parts.

The protection unit according to one embodiment is covered on a lower surface of the inner rotor 40, and is a protective cover 400 that is coupled to a lower surface of the stator support 270.

The protective cover 400 is configured to have a disc shape that is formed to fit the shape of the inner rotor 40, bolt coupling holes 402 are formed on a lower surface of the core fixing portion 272 of the stator support 270, and edges of the protective cover 400 are coupled to the bolt coupling holes 402.

A bent portion 404 that has been bent at right angles is formed on an edge of the protective cover 400 and the bent portion 404 is in contact with an outer surface of a protruding portion 406 on which the bolt coupling holes 402 of the stator support are formed.

In this way, the protective cover 400 is provided in the stator support 270 to thereby protect the inner rotor 40, and thus it is possible to avoid interference between the inner rotor 40 and the other parts. As a result, utilization of space may be improved with no need to have a distance to avoid interference between the motor and other components.

Figure 4:
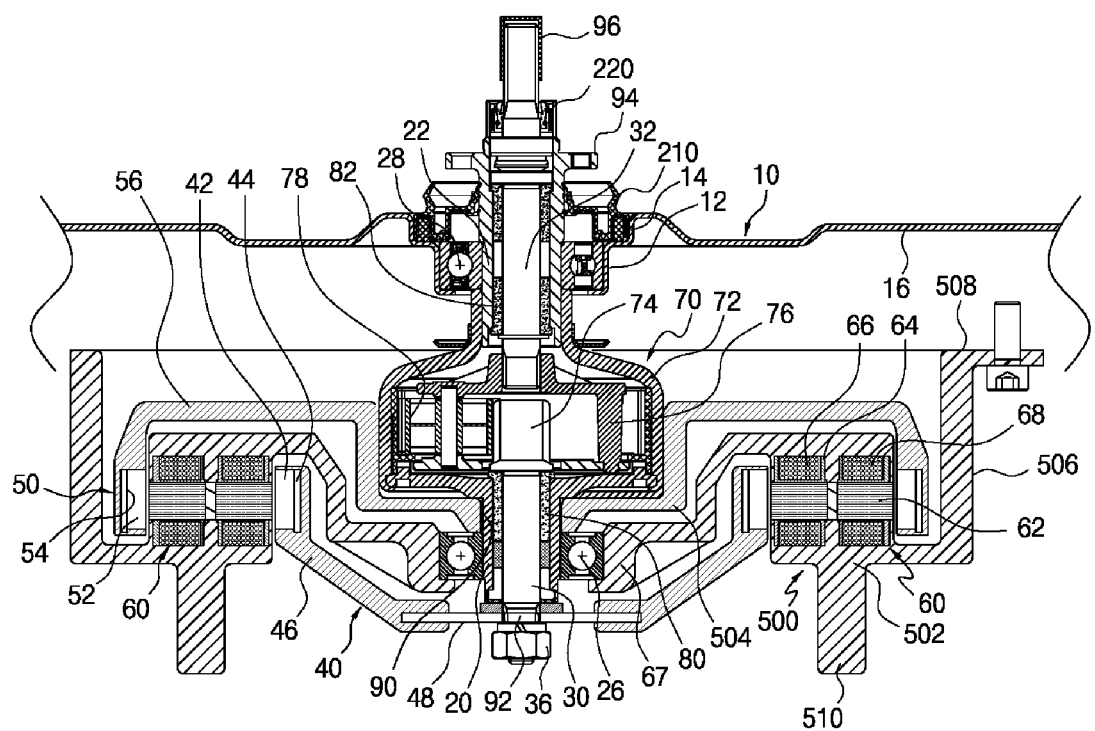
FIG. 4 is a cross-sectional view of a washing machine driving apparatus according to another embodiment of the present invention.

FIG. 4 shows a washing machine driving apparatus according to a second embodiment, in which a stator support has a structure different from that of the first embodiment.

The stator support 500 according to the second embodiment includes: a core fixing portion 502 in which a stator core 62 is mounted; a bearing fixing portion 504 that extends inwardly from the core fixing portion 502 and holds a first bearing 26; a cover portion 506 extending outwardly from the core fixing portion 502 and formed in a cylindrical shape thereby protecting the outer rotor 50; an outer tub fixing portion 508 extending outwardly from the cover portion 506 and fixed to the outer tub 110; and a protective fence which extends from a lower surface of the core fixing portion 502.

The protective fence according to the second embodiment includes a protector 510 that is formed in a cylindrical shape extending integrally from the core fixing portion 502 of the stator support 500, or that is arranged at a predetermined interval in a circumferential direction of the inner rotor, and that is positioned to be wrapped around the outer surface of the inner rotor.

The protector 510 may have a structure that is formed in a circular form or protrudingly in the form of projections extending to a predetermined height in the core fixing portion 502 of the stator support 500, and that is arranged at a predetermined interval in a circumferential direction of the core fixing portion 502.

In addition, the protector 510 may employ any structure that extends integrally from a lower surface of the stator support 500 and that wraps an outer surface of the inner rotor 40.

In this way, the protector 510 is arranged to extend integrally from a lower surface of the stator support 500 and to wrap an outer surface of the inner rotor 40, to thus prevent the inner rotor 40 from interfering with other parts.

In this way, the protector 510 is integrally formed with the stator support 500 according to the second embodiment, and need not be provided with a protective cover to protect the inner rotor 40 separately, thereby reducing the number of parts.

Figure 5:
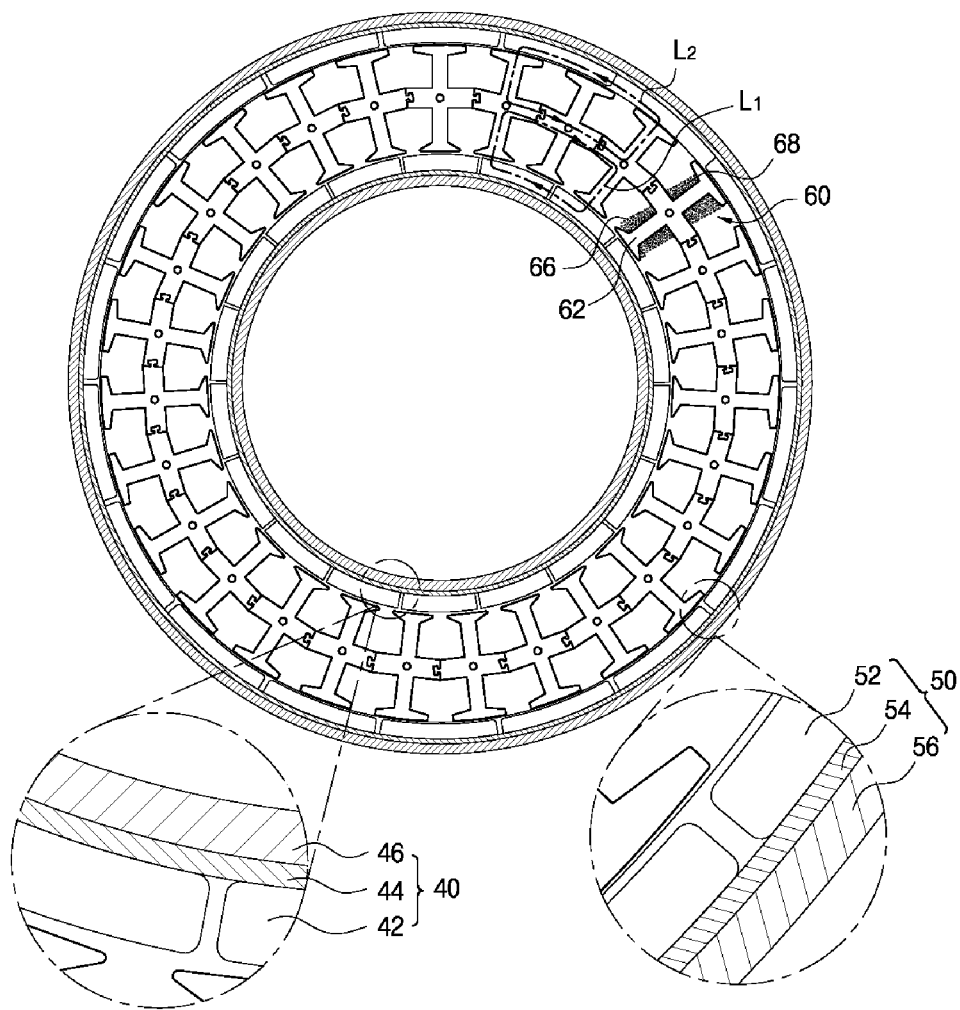
FIG. 5 is a horizontal cross-sectional view of a washing machine motor according to an embodiment of the present invention.
Figure 6:
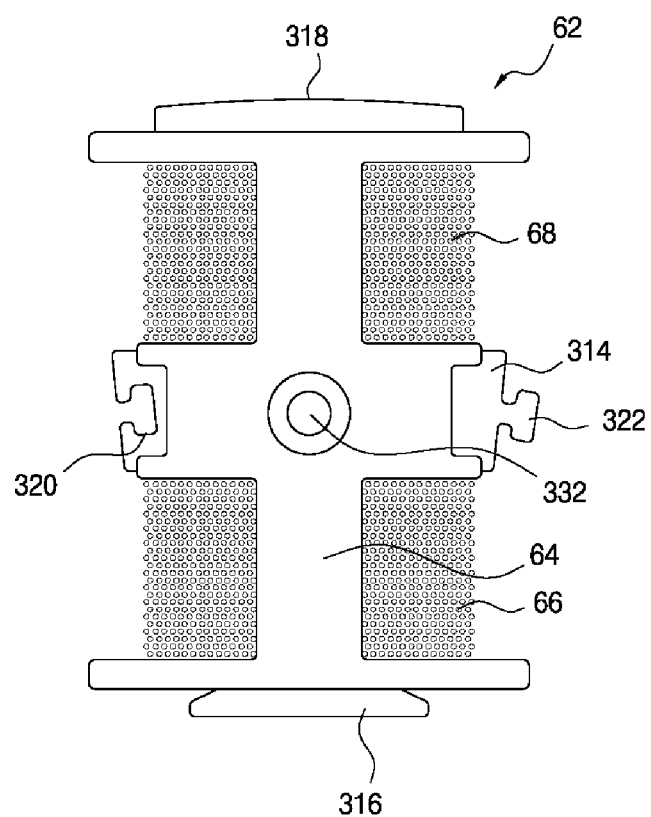
FIG. 6 is a cross-sectional view of a stator according to an embodiment of the present invention.
Figure 7:
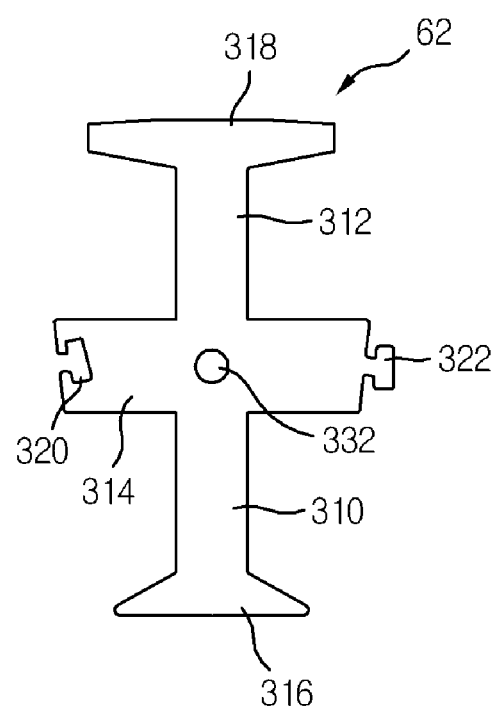
FIG. 7 is a cross-sectional view of a stator core according to an embodiment of the present invention.

As shown in FIGS. 5 to 7, the stator core 62 includes: a first tooth portion 310 around which the first coil 66 is wound; a second tooth portion 312 that is formed on the other side of the first tooth portion 310 and around which the second coil 68 is wound; a partition 314 for partitioning between the first tooth portion 310 and the second tooth portion 312; and couplers 320 and 322 formed on both lateral ends of the partition 314 and interconnecting between the adjoining stator cores 62.

Here, a first drive signal is applied to the first coil 66 and a second drive signal is applied to the second coil 68. Accordingly, when the first drive signal is applied to only the first coil 66, only the inner rotor 40 is rotated, when the second drive signal is applied to only the second coil 68, only the outer rotor 50 is rotated, and when the first drive signal and the second drive signal are applied to the first coil 66 and second coil 68, respectively, both the inner rotor 40 and outer rotor 50 are rotated.

A throughhole 332 is formed at the center of the partition 314, to thus serve to prevent a first magnetic circuit formed by the first coil 66 and a second magnetic circuit formed by the second coil 68 from being interfered with each other. The throughhole 332 may be formed in a circular shape, but may be formed long in a slot type in the lateral direction of the partition 314.

A first flange 316 is formed at the end of the first tooth portion 310 so as to be disposed to face the first magnets 42 and a second flange 318 is formed at the end of the second tooth portion 312 so as to be disposed to face the second magnets 52.

The first flange 316 and the second flange 318 are formed to have inward and outward curved surfaces at predetermined curvatures, respectively, to correspond to the first magnet 42 of the inner rotor 40 and the second magnet 52 of the outer rotor 50. Thus, the roundness of the inner circumferential surface and the outer circumferential surface of the stator core 62 is increased and thus certain magnetic gaps may be maintained between the inner circumferential surface of the stator 60 and the first magnet 42 and between the outer circumferential surface of the stator 60 and the second magnet 52, respectively, although the inner circumferential surface and outer circumferential surface of the stator 60 are proximate to the first magnet 42 and the second magnet 52.

The plurality of stator cores 62 should have a structure of being directly connected to each other so as to form a magnetic circuit. Thus, the couplers 320 and 322 of one stator core 62 have a structure of being directly connected to the couplers 322 and 320 of another adjacent stator core 62 so that the stator cores 62 may be energized.

As an example, these couplers 320 and 322 are configured so that a coupling protrusion 322 is protrudingly formed at one side of the partition 314 and a coupling groove 320 with which a coupling protrusion 322 of a neighboring stator core 62 is fitted and coupled is formed at the other side of the partition 314. Thus, when the coupling protrusion 322 of one state core is fitted into and coupled with the coupling groove 320 of a neighboring stator core, the stator cores 62 are annularly arranged, and have a directly cross-linked structure that the stator cores 62 are directly connected with each other.

In addition to the above structure, the couplers have a structure that pinholes are formed at both end portions of the partition of each of the stator cores, and a pin member is fitted into and coupled with the pinholes of two stator cores at a state where the stator cores contact each other, to thereby employ a structure of connecting between the stator cores. Alternatively, the couplers may employ a method of caulking the stator cores by using a caulking member in a state where the stator cores contact each other.

The washing machine driving apparatus according to an embodiment of the present invention forms a first magnetic circuit $L_1$ between the inner rotor 40 and one side of the stator 60 where the first coil 66 is wound, and forms a second magnetic circuit $L_2$ between the outer rotor 50 and the other side of the stator 60 where the second coil 68 is wound, to thus form a pair of magnetic circuits each independent to each other. As a result, the inner rotor 40 and the outer rotor 50 may be respectively driven separately.

More specifically, the first magnetic circuit $L_1$ includes the first magnet 42 of the N-pole, the first tooth portion 310 on which the first coil 66 is wound, an inner part of the partition 314, the first magnet 42 of the S-pole adjacent to the first magnet 42 of the N-pole, and the inner rotor support 46.

In addition, the second magnetic circuit $L_2$ includes the second magnet 52 of the N-pole, the second teeth portion 312 facing the second magnet 52 of the N-pole and on which the second coil 68 is wound, an outer part of the partition 314, the second magnet 52 of the S-pole, and the outer rotor support 56.

The function of the washing machine driving apparatus according to an embodiment of the present invention will now be described.

The stator 60 that forms a double stator according to an embodiment of the present invention may drive the inner rotor 40 and the outer rotor 50, selectively or simultaneously, by a drive signal that is applied to the first coil 66 and the second coil 68, selectively or simultaneously.

The first and second outer shafts 20 and 22 associated with the planetary gear set 70 are rotatably supported in two-way directions by first and second bearings 26 and 28 in an outside of the first and second outer shafts 20 and 22, and by sleeve bearings 80 and 82 in an inside of the first and second outer shafts 20 and 22.

Since the planetary gear set 70 according to an embodiment of the present invention is rotatably supported in two-way directions as described above, a gear ratio of a transmission output generated from the carrier 76 in the planetary gear set 70 may be controlled by a second input applied to the ring gear 72 through the first outer shaft 20, when a first input is applied to the sun gear 74 through the first inner shaft 30.

When a round per minute (RPM) of the second input which is applied to the ring gear 72 is set to be smaller than that of the first input which is applied to the sun gear 74, an output of the carrier 76 is decelerated at the RPM of the first input.

That is, when the first input has a high-speed, low-torque characteristic, the output of the carrier 76 has a low-speed high-torque characteristic, and is used for a laundry washing or rinsing stroke of the washing machine.

Further, when the direction of rotation of the second input is opposite to that of the first input, and the RPM of the second input is one quarter of the first input, the reduction in RPM of the first input from the carrier 76 is generated to the maximum output.

Further, the output of the ring gear 72 is not shifted when a rotational direction and a RPM of the first input are the same as those of the second input.

That is, when the first and second inputs have a high-speed, low-torque characteristic, respectively, the output of the ring gear 72 is a high-speed, low-torque characteristic, and is used for a dehydrating stroke of the washing machine.

Controlling the washing machine using the above-described washing machine driving apparatus will be described as follows.

First, when only the pulsator 130 is driven during a washing operation, and a drive signal is applied to the first coil 66, the inner rotor 40 is rotated and the first inner shaft 30 connected to the inner rotor 50 is rotated. Then, the rotational speed of the inner rotor 40 is decelerated by the planetary gear set 70 coupled to the first inner shaft 30 to then be transmitted to the second inner shaft 32, and thus the pulsator 130 connected to the second inner shaft 32 is rotated.

Thus, the rotational speed of the pulsator 130 is reduced and torque thereof is increased by the planetary gear set 70. Accordingly, the washing machine driving apparatus according to the embodiment of the present invention may be applied to a large-capacity washing machine.

In addition, when only the washing tub 120 is driven to rotate, and a drive signal is applied to the second coil 68, the outer rotor 50 is rotated by the magnetic circuit $L_2$ and the outer shafts 20 and 22 connected to the outer rotor 50 are rotated to rotate the washing tub 120.

In this case, since the rotational force of the outer rotor 50 having a large torque is transmitted to the washing tub 120, it is easy to rotate the washing tub 120 that requires a large torque. Therefore, it is possible to raise the capacity of the washing machine, and it is also possible to implement a large capacity washing machine.

Further, when both the pulsator 130 and the washing tub 120 are simultaneously rotated, during a dehydration stroke and a rinsing stroke, the drive signals are simultaneously applied to the first coil 66 and the second coil 68, respectively. Then, the inner rotor 40 is rotated by the magnetic circuit $L_1$, and thus the inner shafts 30 and 32 associated with the inner rotor 40 are rotated, to thereby rotate the pulsator 130. Then, the outer rotor 50 is rotated by the magnetic circuit by $L_2$, and thus the outer shafts 20 and 22 connected to the outer rotor 50 are rotated to thereby rotate the washing tub 120.

In addition, when the pulsator 130 and the washing tub 120 are reversely rotated to each other during a detangle stroke or in order to remove laundry tangle such as laundry jam, drive signals are applied to the first coil 66 and the second coil 68 simultaneously, and the first drive signal applied to the first coil 66 and the second drive signal applied to the second coil 68 are each controlled independently, to thereby rotate the pulsator 130 and the washing tub 120 in opposite directions to each other while rotating the inner rotor 40 and the outer rotor 50 in opposite directions to each other.

In addition, the pulsator 130 and the washing tub 120 may be rotated with a time difference in an identical direction, to thus form a variety of wash water flows.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention may be applied to a washing machine driving apparatus that may drive an inner rotor and an outer rotor independently, and a washing machine having the same.

The invention claimed is:

1. A washing machine driving apparatus comprising:
a drive motor of a double rotor-double stator structure in which the drive motor comprises an inner rotor and an outer rotor that are controllable independently by a double stator, and optionally generates an inner rotor output and an outer rotor output;
a first inner shaft that transfers the inner rotor output as a first input;
a first outer shaft that is rotatably coupled to an outer periphery of the first inner shaft, and that transfers the outer rotor output as a second input;
a planetary gear unit in which a gear ratio of a transmission output that is generated from a carrier is controlled by the second input is applied to a ring gear through the first outer shaft, when the first input is applied to a sun gear through the first inner shaft; and a protection unit for protecting the inner rotor in which an outer peripheral portion of the protection unit is supported by the double stator, wherein the double stator comprises:

a stator core assembly around a number of stator cores, wherein each of the stator cores is formed of a first teeth portion around which a first coil is wound, a second teeth portion around which a second coil is wound, and a partition integrally formed with and between the first teeth portion and the second teeth portion, and wherein the first teeth portion faces the inner rotor with an air gap to drive the inner rotor, the second teeth portion faces the outer rotor with an air gap to drive the outer rotor independently from the inner rotor; and a stator support that is formed integrally with the stator core assembly and on an outer circumferential portion of which an outer tub is fixed and on an inner circumferential portion of which the first outer shaft is rotatably supported, wherein the stator support comprises:

a core fixing portion in which the stator cores are mounted;

a bearing fixing portion extending inwardly from the core fixing portion to thus fix a first bearing;

a cover portion extending outwardly from the core fixing portion and that is formed in a cylindrical shape to thus secure the outer rotor; and an outer tub fixing portion extending outwardly from the cover portion and that is fixed to the outer tub, and wherein the protection unit is a protective cover, wherein the protective cover is located to cover a lower surface of the inner rotor and an edge of the protective cover is fixed to the stator support.

2. The washing machine driving apparatus of claim 1, wherein the outer rotor is connected to the first outer shaft, the inner rotor is connected to the first inner shaft, and the first inner shaft is rotatably mounted in an inside of the first outer shaft.

3. The washing machine driving apparatus of claim 2, further comprising:

a second outer shaft connected to the ring gear of the planetary gear unit; and a second inner shaft connected to the carrier of the planetary gear unit.

4. The washing machine driving apparatus of claim 3, wherein the planetary gear unit comprises:

a ring gear connecting between the first outer shaft and the second outer shaft;

a sun gear coupled to the first inner shaft;

a plurality of planetary gears engaged to an outer surface of the sun gear and an inner surface of the ring gear; and a carrier to which the plurality of planetary gears are rotatably supported and that is connected to the second inner shaft.

5. The washing machine driving apparatus of claim 3, wherein the first outer shaft is rotatably supported in two-way directions by the first bearing, and the second outer shaft is rotatably supported in two-way directions by a second bearing, wherein the first bearing is fixed to the stator support and the second bearing is mounted in a bearing housing.

6. The washing machine driving apparatus of claim 1, wherein a revolution per minute (RPM) of the second input which is applied to the ring gear is set to be smaller than that of the first input which is applied to the sun gear, and an output of the carrier is decelerated at the RPM of the first input.

7. The washing machine driving apparatus of claim 6, wherein the first input has a high-speed, low-torque characteristic, and the output of the carrier has a low-speed high-torque characteristic, and is used for a laundry washing or rinsing stroke of the washing machine.

8. The washing machine driving apparatus of claim 1, wherein an output of the ring gear is not shifted when a rotational direction and a RPM of the first input are the same as those of the second input.

9. The washing machine driving apparatus of claim 8, wherein the first and second inputs have a high-speed, low-torque characteristic, respectively, and the output of the ring gear is a high-speed, low-torque characteristic, and is used for a dehydrating stroke of the washing machine.

10. The washing machine driving apparatus of claim 1, wherein bolt coupling holes are formed on the core fixing portion of the stator core support and the protective cover is coupled to the bolt coupling holes with fastening bolts.

* * * * *